(12) United States Patent
Furuhata

(10) Patent No.: US 8,411,957 B2
(45) Date of Patent: Apr. 2, 2013

(54) CHARACTER RECOGNITION RESULT VERIFICATION APPARATUS AND CHARACTER RECOGNITION RESULT VERIFICATION METHOD

(75) Inventor: Akio Furuhata, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 246 days.

(21) Appl. No.: 12/961,204

(22) Filed: Dec. 6, 2010

(65) Prior Publication Data

US 2011/0280452 A1     Nov. 17, 2011

(30) Foreign Application Priority Data

May 12, 2010 (JP) ................. P2010-110400

(51) Int. Cl.
*G06K 9/18* (2006.01)
(52) U.S. Cl. ....................................... 382/182
(58) Field of Classification Search ............ 382/182
See application file for complete search history.

(56) References Cited

U.S. PATENT DOCUMENTS

| | | | | |
|---|---|---|---|---|
| 3,278,899 A | * | 10/1966 | Shelton, Jr. et al. | 382/278 |
| 7,711,189 B2 | | 5/2010 | Katsuyama et al. | |
| 2009/0324081 A1 | | 12/2009 | Oh et al. | |

FOREIGN PATENT DOCUMENTS

| | | |
|---|---|---|
| CN | 1987895 | 6/2007 |
| CN | 101615251 | 12/2009 |
| EP | 2 138 955 A2 | 12/2009 |
| JP | 6-119484 | 4/1994 |
| JP | 4049289 | 12/2007 |

OTHER PUBLICATIONS

Notification of the First Office Action issued by the State Intellectual Property Office of the People's Republic of China on Nov. 29, 2012, for Chinese Patent Application No. 201010588384.5, and English-language translation thereof.

* cited by examiner

*Primary Examiner* — Samir Ahmed
*Assistant Examiner* — Totam Le
(74) *Attorney, Agent, or Firm* — Finnegan, Henderson, Farabow, Garrett & Dunner, L.L.P.

(57) ABSTRACT

In one embodiment, a character recognition result verification apparatus has a group generation section and a verification image generation section. The group generation section generates a group including a plurality of character images recognized as the same character from a document image including a plurality of character images. The verification image generation section generates a verification image including a first region and a second region by superimposing the plurality of character images included in the generated group. The first region corresponds to a pixel having the same pixel value in all of the plurality of character images. The second region corresponds to a pixel having the same pixel value in a part of the plurality of character images.

16 Claims, 8 Drawing Sheets

CHARACTER RECOGNITION RESULT VERIFICATION APPARATUS AND CHARACTER RECOGNITION RESULT VERIFICATION METHOD

CROSS-REFERENCE TO RELATED APPLICATION

This application is based upon and claims the benefit of priority from the prior Japanese Patent Application No. 2010-110400, filed on May 12, 2010; the entire contents of which are incorporated herein by reference.

FIELD

Embodiments described herein relate generally to a character recognition result verification apparatus and a character recognition result verification method.

BACKGROUND

When a character is recognized (character recognition) from an image, verification and correction of a recognition result by an operator is required in order to correct errors in recognition. In correcting the recognition result, usually character images and those recognition results are displayed side-by-side, and verified by visual observation.

A technique for verifying and correcting a character recognition result is disclosed (for example, see JP-A 06-119484 (KOKAI)).

Meanwhile, a result of character recognition of an image is not necessarily free from errors even with a high recognition accuracy. Thus, after all it is necessary that an operator verifies every character, consuming significant labor and time.

DETAILED DESCRIPTION

In one embodiment, a character recognition result verification apparatus has a group generation section and a verification image generation section. The group generation section generates a group including a plurality of character images which are recognized as the same character from a document image including a plurality of character images. The verification image generation section generates a verification image including a first region and a second region by superimposing the plurality of character images included in the generated group. The first region corresponds to a pixel having the same pixel value in all of the plurality of character images. The second region corresponds to a pixel having the same pixel value in a part of the plurality of character images.

Hereinafter, embodiments will be described in detail with reference to the drawings.

(First Embodiment)

Figure 1:
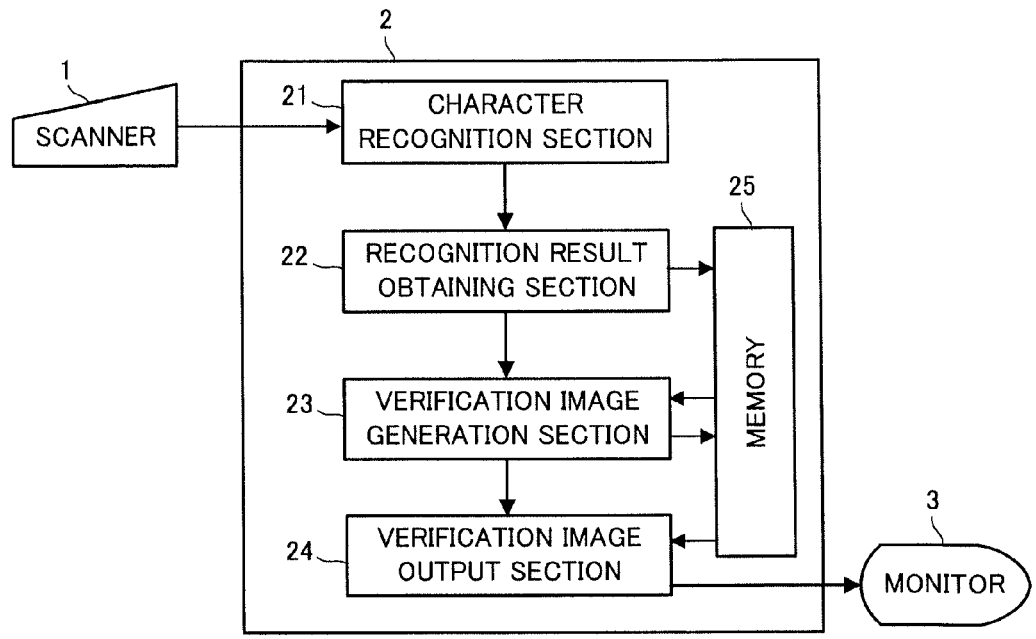
FIG. 1 is diagram showing a configuration of a character recognition result verification apparatus of a first embodiment.

FIG. 1 is a diagram showing a configuration of a character recognition result verification system (character recognition system) of a first embodiment. As shown in FIG. 1, the character recognition system of this embodiment includes an image reading device such as a scanner 1, a display device such as a monitor 3, and a computer 2 to which these devices are connected.

The computer 2 has a character recognition section 21, a recognition result obtaining section 22, a verification image generation section 23, a verification image output section 24, a memory 25 and the like. The character recognition section 21, the recognition result obtaining section 22, the verification image generation section 23, and the verification image output section 24 are each realized as functions of software installed in a hard disk device.

The character recognition section 21 recognizes an image (a document image) which is optically read by the scanner 1. The recognition result obtaining section 22 obtains character recognition results (character codes and character images (included in the document image) corresponding to each character recognition result) recognized by the character recognition section 21 and stores the above in the memory 25.

As already described, the character recognition section 21 can be realized by a combination of the computer 2 and the software. However, it is possible to realize the character recognition section 21 by hardware (a character recognition device) different from the computer 2, similarly to the scanner 1.

The character images are binary images cut out from binarized document image by a unit of one character.

The character code is obtained by character recognition of the character image. The character recognition section 21 stores a plurality of combinations of the character code (an identifier for recognized character) and character patterns (for example, an image indicating a feature of a character, a feature itself, or character image itself) cut out from document image (character database). The character recognition section 21 selects the character code regarded to correspond best to the character image (character recognition).

A result of character recognition can be represented by text data for example instead of the character code.

The recognition result obtaining section 22 obtains a plurality of character images and classifies that into groups. The recognition result obtaining section 22 functions as a group generation section generating a group including a plurality of character images which are recognized as the same character from a document image which includes a plurality of character images.

As a standard for classification into groups, whether or not the character codes of the character recognition results are the same is used. That is, a plurality of character images which is cut out from document image and recognized as the same character (the same character code) is classified into the same group and stored in the memory 25.

As a standard for group classification, a result of font recognition in each character image and etc. for example can be added, other than the character code as the character recognition result. In such a case, the plural character images can be classified into a hierarchical group by character codes and types of fonts. For example, a group of character images of a character code "2" (where a character image indicates "2") is further classified into groups (for example, a group of a font "Arial", another group of a font "MS Sans Serif") according to a unit of a font type.

The verification image generation section 23 superimposes the plural character images of the same group obtained by the recognition result obtaining section 22 and generates a verification image for an operator to verify results. The verification image has a first region and a second region whose display states are different from each other. The first region corresponds to first image which corresponds to the image that all of the plural character images indicate the same specific pixel value in corresponding pixels in terms of positions. The second region corresponds to second image which corresponds to the image that in only a part of the plural character images indicate the same specified pixel value in corresponding pixels in terms of positions. The operator is a personnel to verify and correct a recognition result.

That is, the verification image generation section 23 generates the verification image to be presented to the operator from the character recognition result (the character code and the character image) of the memory 25. In other words, the verification image generation section 23 superimposes the plural character images of the same group obtained by the recognition result obtaining section 22 and generates the verification image to be presented to the operator.

In the verification image, a portion A1 (a portion being a part of a character in every character image in a group), a portion A2 (a portion being a part of a character in at least one piece of character image in the group and not being a part of the character of at least one piece of the character image), and a portion A3 (a portion not being a part of a character in any character image in the group) can be displayed differently. For example, colors or shades of the image are made different in the portions A1 to A3.

It should be noted that each of the portions A1 to A3 can be further sectioned and displayed. For example, it is possible to change a display color or shade in the portion A2 depending on a frequency of appearances of the specified pixel values in the portion A2. More specifically, the portion A2 is sectioned into portions A21, A22, . . . A2j being parts of the character in the character image of "2/N to $n_1$/N", "$(n_1+1)$/N to $n_2$/N", . . . "$(n_{j-1}+1)$/N to $n_j$/N" in the group (N: total number of character images in group, $n_j$: integer).

The verification image output section 24 presents a verification image for performing verification and correction of the recognition result and displays a message to operator prompting to perform verification and correction of the recognition result. That is, the verification image output section 24 outputs the verification image generated by the verification image generation section 23 to the monitor 3 in order to present the verification image to the operator.

The monitor 3 displays the verification image outputted from the verification image output section 24 in the screen and present the verification image to the operator.

A main hardware part of the computer 2 is constituted by a personal computer (PC) for example, and a main function is realized by software installed in a hard disk device. It is possible to realize the main function, other than by the computer 2, by constituting each component of the main function as one piece of hardware and combining those pieces of hardware.

Hereinafter, an operation of the character recognition system of the first embodiment will be described with reference to FIG. 2 to FIG. 6. It should be noted that, though an example in which recognition of a numeric character is performed will be explained, another character than the numeric character such as an alphabetical character, a Chinese character or the like for example can be used.

First, the character recognition section 21 recognizes a sheet image which the scanner 1 connected to the computer 2 has read from a sheet and has inputted to the computer 2. As a result, the character recognition section 21 obtains a character recognition result and a position in which each character exists, and stores the above in the memory 25.

Figure 2:
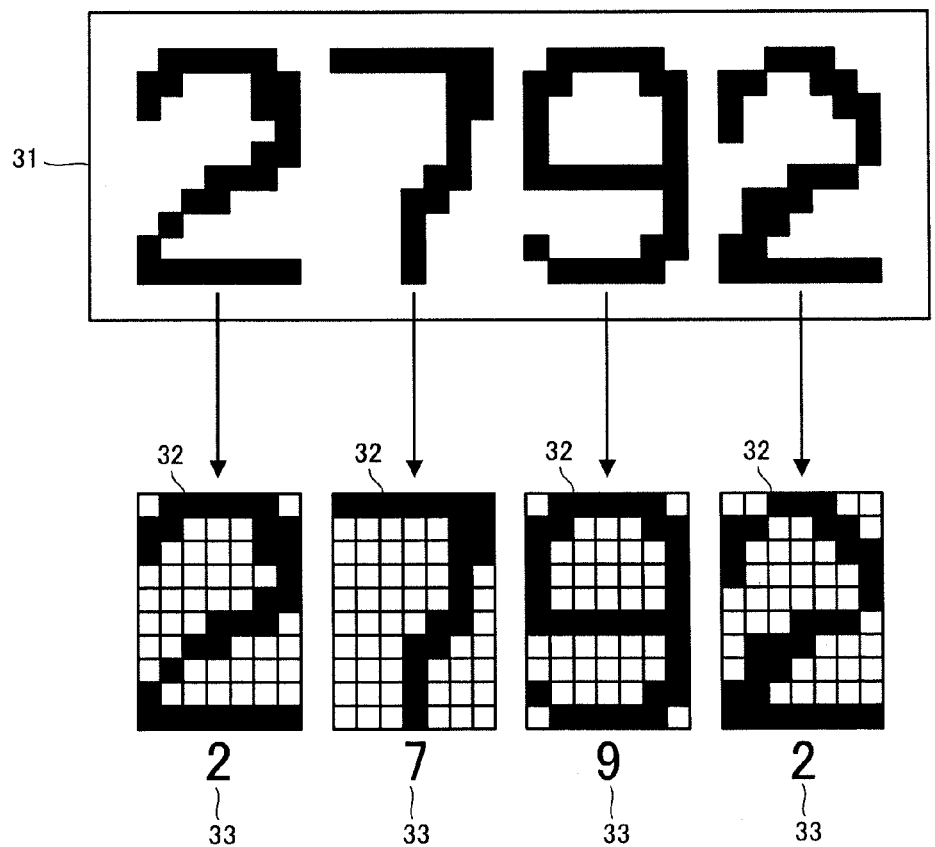
FIG. 2 is a diagram showing a state in which a character is recognized from a character string region.

As shown in FIG. 2, the character recognition section 21 cuts out a region 31 of a character string to be recognized in the sheet image. The character recognition section 21 cuts out character images 32 per one character from the region 31 of the character string. Further, the character recognition section 21 recognizes the character image 32 as a character and generates a character code (text) 33. In this way, the character recognition section 21 generates the character image 32 and the character code 33 corresponding to the character image 32.

The recognition result obtaining section 22 obtains the character code (text) 33 and the character image 32 which are generated by the character recognition section 21 and stores the above in the memory 25.

It should be noted that here the character image 32 being an object to be processed for verification image generation is a binary image. However, the character image 32 can be three or more-valued image such as a gray image or a color image. In such cases, a binary character image can be obtained by binarizing a three or more-valued image by "Otsu's method" or the like for example.

Next, the verification image generation section 23 reads the character images 32 of the same group from the memory 25 and generates a verification image from the character images 32. More specifically, first, all the obtained character images are classified by character recognition results. In a case of this example, since the character is a numeric character, it is judged which group the recognition result belongs (corresponds) to among numeric character groups "0" to "9". In other words, the character images 32 are classified into ten groups, that is, are grouped.

Figure 3:
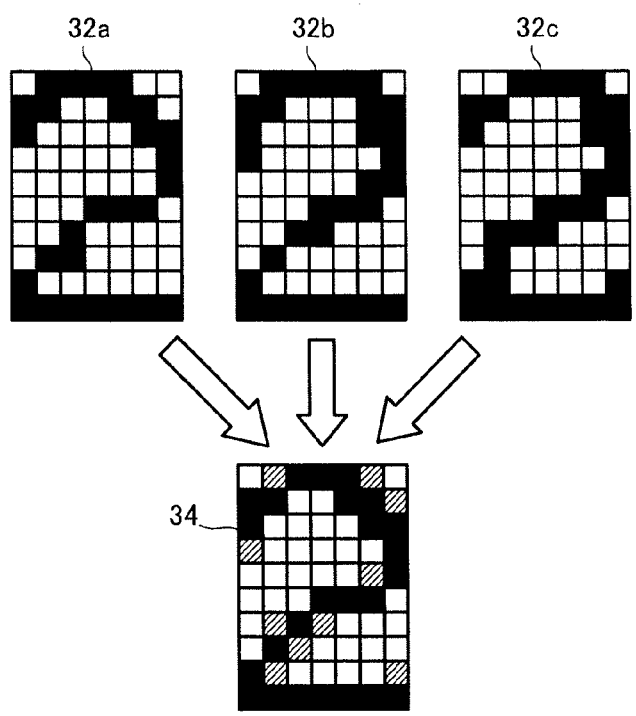
FIG. 3 is a diagram showing an example in which a verification image is created by integrating (combining) three character images.

Next, the verification image generation section 23 generates verification images per the character group by using a plurality of character images in the respective numeric character groups "0" to "9". FIG. 3 shows an example in which a verification image is created from a plurality of character images (three images of a character image 32a, a character image 32b, a character image 32c) of a group for which recognition result is a numeric character "2". These images are obtained from different positions in the same or a plurality of sheet image (s). In this diagram, the example using three character images is shown for the sake of comprehensibility. On the other hand, it is possible to create a verification image from more character images such as from some tens of or some hundreds of character images for example.

Hereinafter, in the binary character image, a pixel being a part of a character is indicated in black and a pixel not being a part of a character is indicated in white.

More specifically, the verification image generation section 23 generates a pixel verification image in which pixels P1, P2, P3 are indicated in black color, gray color and white color respectively as below, from three images 32a to 32c.

Pixel P1: a pixel whose positions in images 32a to 32c correspond to one another and which is black in all Pixel P2: a pixel whose positions in images 32a to 32c correspond to one another and which is black at least in one image and white at least in one image Pixel P3: a pixel whose positions in images 32a to 32c correspond to one another and which is white in all These pixels P1, P2, P3 each correspond to the portions A1, A2, A3 already described.

Here, in a case that sizes of the respective character images are different, it is possible to make the sizes of the character images the same by performing a processing such as nonlinear normalization for example.

The verification image to be generated is not limited to this example. In this example, the verification image is one image whose pixel value is three-valued (white, black, gray). On the other hand, the verification image can be a combination of a plurality of images whose pixel values are binary (white, black). For example, a combination of an AND image (see FIG. 4A) and an OR image (see FIG. 4B) described below can be a verification image.

AND image: an image in which only the pixel P1 is indicated in black and pixels P2, P3 are indicated in white (an image in which all of pixels at the same position are indicated in black)

OR image: an image in which pixels P1, P2 are indicated in black and a pixel P3 is indicated in white (an image in which any of pixels at the same position is indicated in black)

The AND image (the image in which all of pixels at the same position are black) is, in other words, an "image in black in all". The OR image (the image in which any of pixels at the same position is black) is, in other words, an "image in black in any".

It should be noted that the verification image 34 shown in FIG. 3 is expressed by superimposing the AND image and the OR image into one image. In the verification image 34, a portion (corresponding to the portion A2 already described) in which a pixel of white color (white pixel) and a pixel of black color (black pixel) of the pixels of the same portion of the different character images 32a to 32c overlap one another is indicated in gray or by hatching (by oblique lines in the verification image 34 of FIG. 3). It should be noted that the respective portions (portions A1 to A3 already described) of the verification image 34 can be further sectioned depending on a frequency of appearances of the pixel values, thereby to vary display colors or shades.

Further, as the verification image 34, a plurality of such multi-valued images can be used.

Here, a recognition result verification method using the AND image 41 and the OR image 42 will be described with reference to FIG. 4A, FIG. 4B, and FIG. 4C.

Figure 4A:
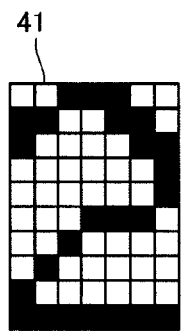
FIG. 4A to FIG. 4C are diagrams showing other examples of verification images.
Figure 4B:
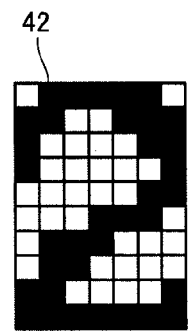
Figure 4C:
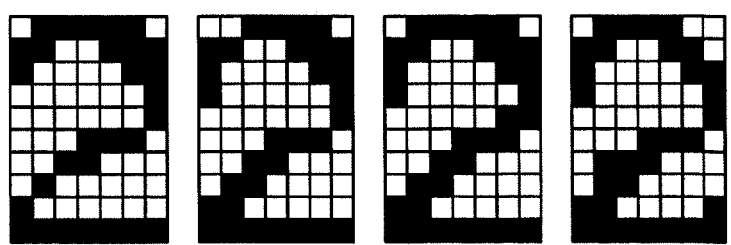

The AND image 41 shown in FIG. 4A is a first image in which, as described above, only the pixel which is black in all the character images in the same group (that is, the pixel regarded as a part of a character) is indicated by a specific pixel value (color or shade, black color in FIG. 4A). Further, the OR image 42 shown in FIG. 4B is a second image in which the pixel equivalent to pixels whose color is black in any of the images in the same group is all indicated by a specific pixel value (color or shade, black color in FIG. 4B).

In other words, a difference between the AND image 41 and the OR image 42, that is, the portion in gray color in the verification image, is a portion (which corresponds to the portion A2 already described) which fluctuates between black and white per a character in the same group.

Since the AND image 41 and the OR image 42 correspond to the same character, the difference therebetween can be regarded as a fluctuation in the same character. In other words, by verifying the recognition result by using the AND image 41 and the OR image 42, the recognition result for all the character images classified into the same group can be collectively verified.

Here, the verification image is a combination of two images (the AND image 41, the OR image 42). On the other hand, the verification image can be a combination of three or more images as shown in FIG. 4C. For example, there can be used a third image in which a pixel equivalent to pixels that are black in N (two or more) character images in the same group has a specific pixel value (for example, black color).

Further, the verification image 34 is expressed by superimposing the AND image 41 and the OR image 42 into one image as described above. The AND image 41 and the OR image 42 can be visually recognized from the verification image easily. Thus, even in a case that the verification image 34 is used, the recognition result for all the character image classified into the same group can be collectively verified.

Next, the verification image output section 24 outputs to a screen of the monitor 3 an image generated in the verification image generation section 23, such as the AND image 41 and the OR image 42, or the verification image 34. As a result, these images are displayed in the screen of the monitor 3. The operator sees the images, and thereby existence or absence of a possibility that a misrecognized character exists among characters with the same recognition result can be verified.

In addition, the verification image output section 24 can have a function to switchingly display the verification image 34, the AND image 41, and the OR image 42 in response to a direction of the operator. Further, the above images can be displayed while being automatically switched.

Figure 5A:
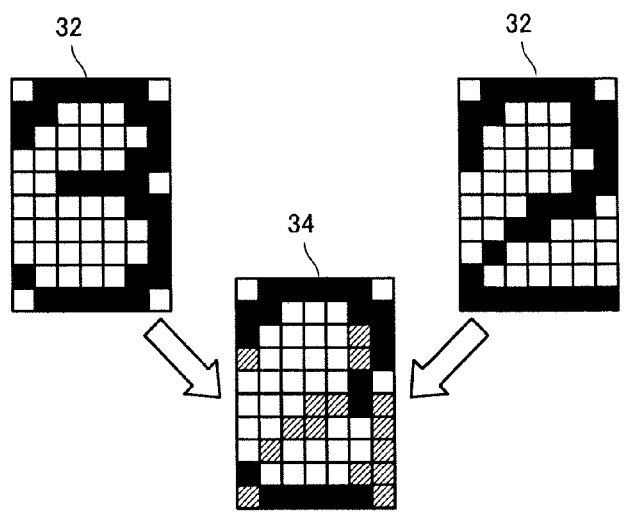
FIG. 5A to FIG. 5C are diagrams showing examples in which numeric character images of "3" and numeric character images of "2" are superimposed.
Figure 5B:
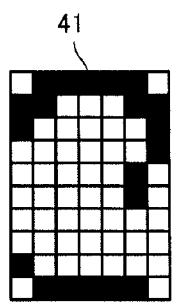
Figure 5C:
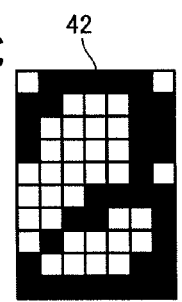

Here, as an example of image composition (superimposing), there is described a case that character images representing different characters in fact are erroneously recognized (misrecognized) as the same character, with reference to FIGS. 5A to 5C. In this case, character images representing different characters are superimposed and a verification image 34, an AND image 41, and an OR image 42 are generated.

FIG. 5A to FIG. 5C each show examples of a verification image 34, AND image 41, and OR image 42 generated by superimposing a numeric character image "3" and a numeric character image "2". In this case, as shown in FIG. 5A to FIG. 5C, both the AND image 41 and the OR image 42 are unsuitable as characters in terms of shapes. Thus, it can be judged that a misrecognized character image is included in this group.

Figure 6A:
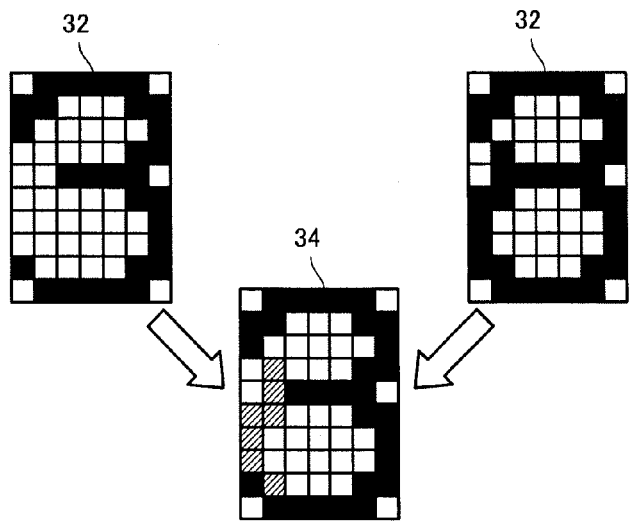
FIG. 6A to FIG. 6C are diagrams showing examples in which numeric character images of "3" and numeric character images of "8" are superimposed.
Figure 6B:
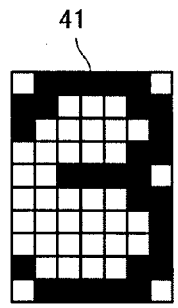
Figure 6C:
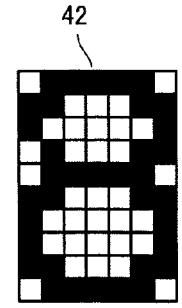

FIG. 6A to FIG. 6C each show examples of a verification image 34, an AND image 41, and an OR image 42 generated by superimposing a numeric character image "3" and a numeric character image "8". In this case, the AND image 41 can be judged to indicate "3" while the OR image 42 can be judged to indicate "8", meaning judgment results are different from each other. Therefore, it can be judged that a misrecognized character image is included in this group.

Figure 7:
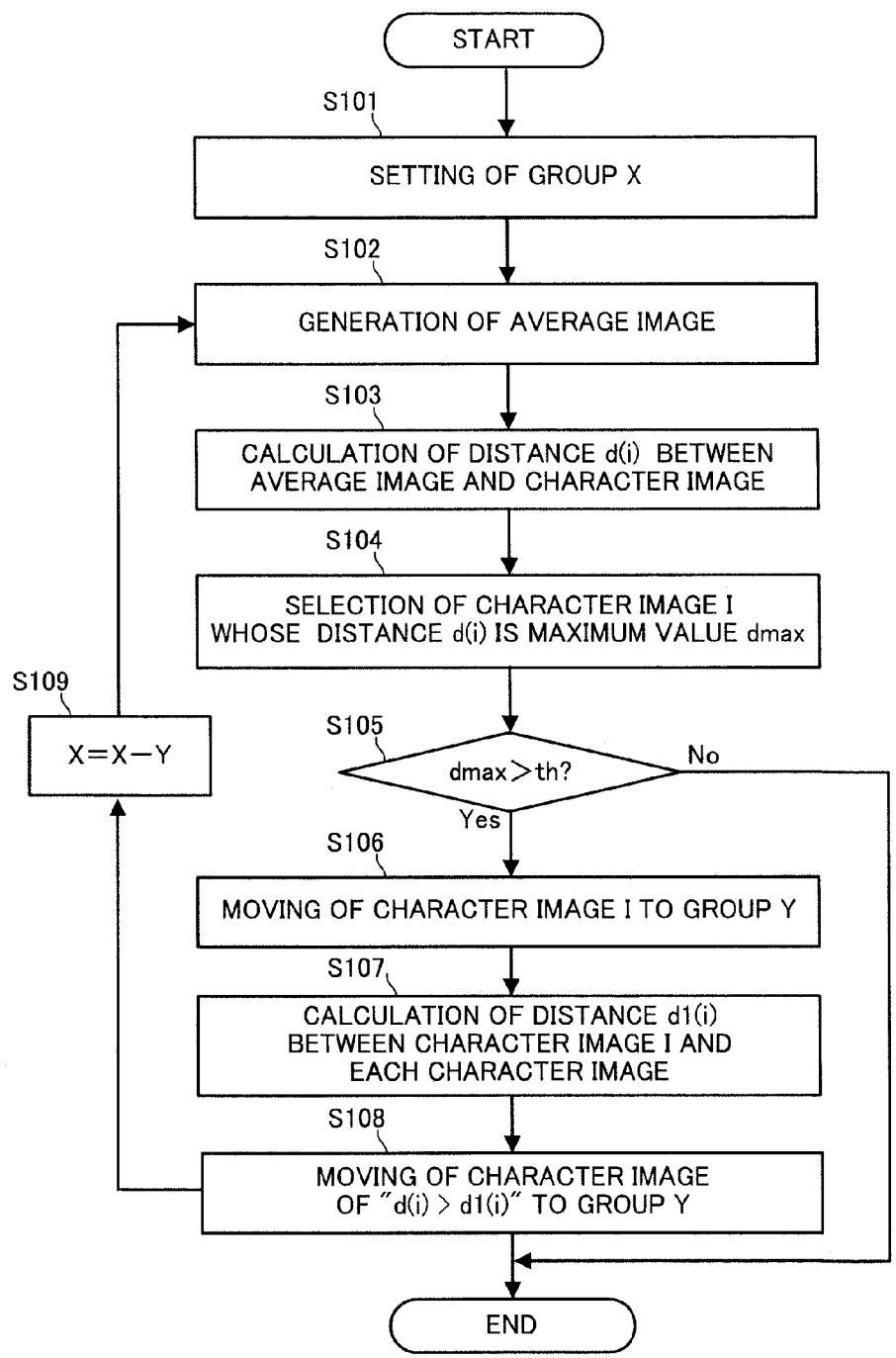
FIG. 7 is a flowchart showing an operation of classifying a character image by comparison with a verification image.

Here, a verification image generation operation will be described with reference to a flowchart of FIG. 7. In the computer 2, the verification image generation section 23 sets an initial group X (S101) and creates an average image of character images in the group X (S102).

The verification image generation section 23 calculates a distance d(i) between pixels of the same position in the created average image and the character image (S103).

The distance d(i) between pixels is a type of index indicating a degree of similarity (a similarity degree) of an i-th character image and the average image. When the distance d(i) is zero, the images are the same. As the distance d(i) gets larger, the images become less similar. Here, i is a serial number of a character image in the group, taking a value from 1 to N. It should be noted that N is the number of the character images in the group.

The distance d(i) between pixels can be defined as a square root of a square sum of a density difference between corresponding meshes (pixels) of the character image and the average image, as in the following formula (1) for example.

$$d(i) = (\Sigma(C(i)-C0)^2)^{1/2} \quad \text{formula (1)}$$

d(i): distance between pixels
C(i): density value of i-th character image
C0: density value of average image Then, the verification image generation section 23 selects a character image I in which the distance d(i) between pixels is a maximum value dmax (S104).

Further, the verification image generation section 23 compares the maximum value dmax with a pre-set threshold value th for classification (S105). When the maximum value dmax is larger than the classification threshold value th (Yes in S105), the verification image generation section 23 moves the selected character image I (I-th character image) to new group Y (S106).

The verification image generation section 23 computes, that is, obtains by calculation, a distance d1(i) between the character image I of the group Y and each character image (i-th character image) remaining in the group X (S107). It should be noted that the distance d1(i) between pixels can be defined as a square root of a square sum of a density difference between corresponding pixels (meshes) of the i-th character image and the character image I by the above-described formula (1).

The verification image generation section 23 compares the computed distance d1(i) between pixels with the distance d(i) between pixels. The verification image generation section 23 moves a character image whose distance d1(i) between pixels is smaller than the distance d(i) between pixels to the group Y (S108). In other words, the character image similar to the character image I is moved to the group Y.

The above-described processing is performed to all the character images in the group X (S109), and then the processings end.

As described above, according to the first embodiment, an operator can collectively verify recognition results of many characters by verifying a verification image 34 displayed in the monitor 3. As a result, it suffices if the recognition result is corrected only for character data of only the group which includes some errors. Thus, the recognition result can be verified at a high speed.

(Second Embodiment)

Figure 8:
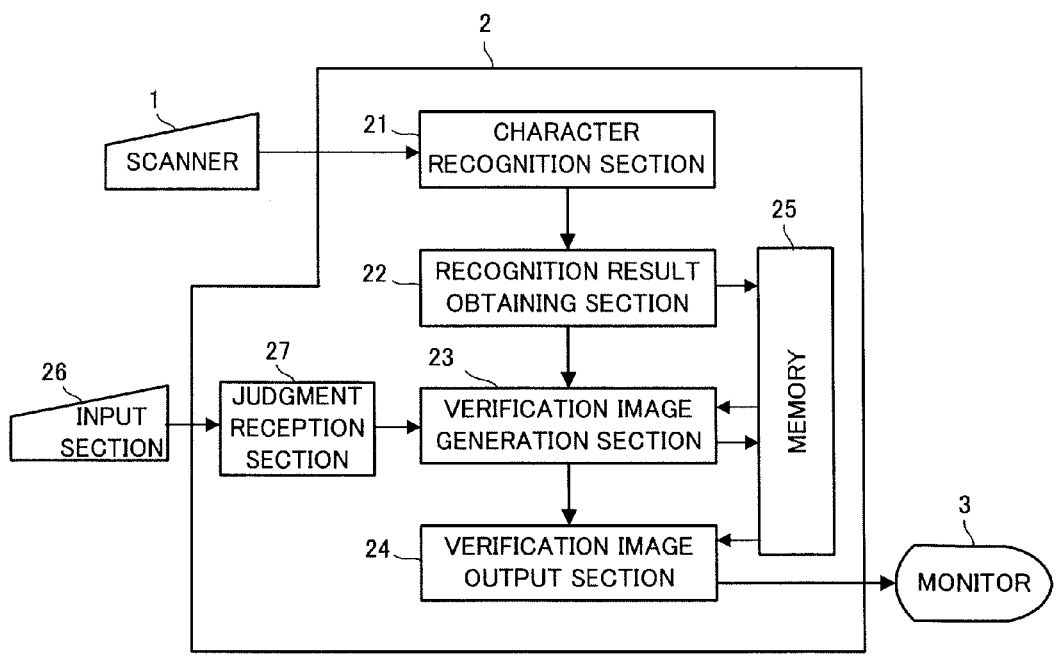
FIG. 8 is a diagram showing a configuration of a character recognition result verification apparatus of a second embodiment.
Figure 9:
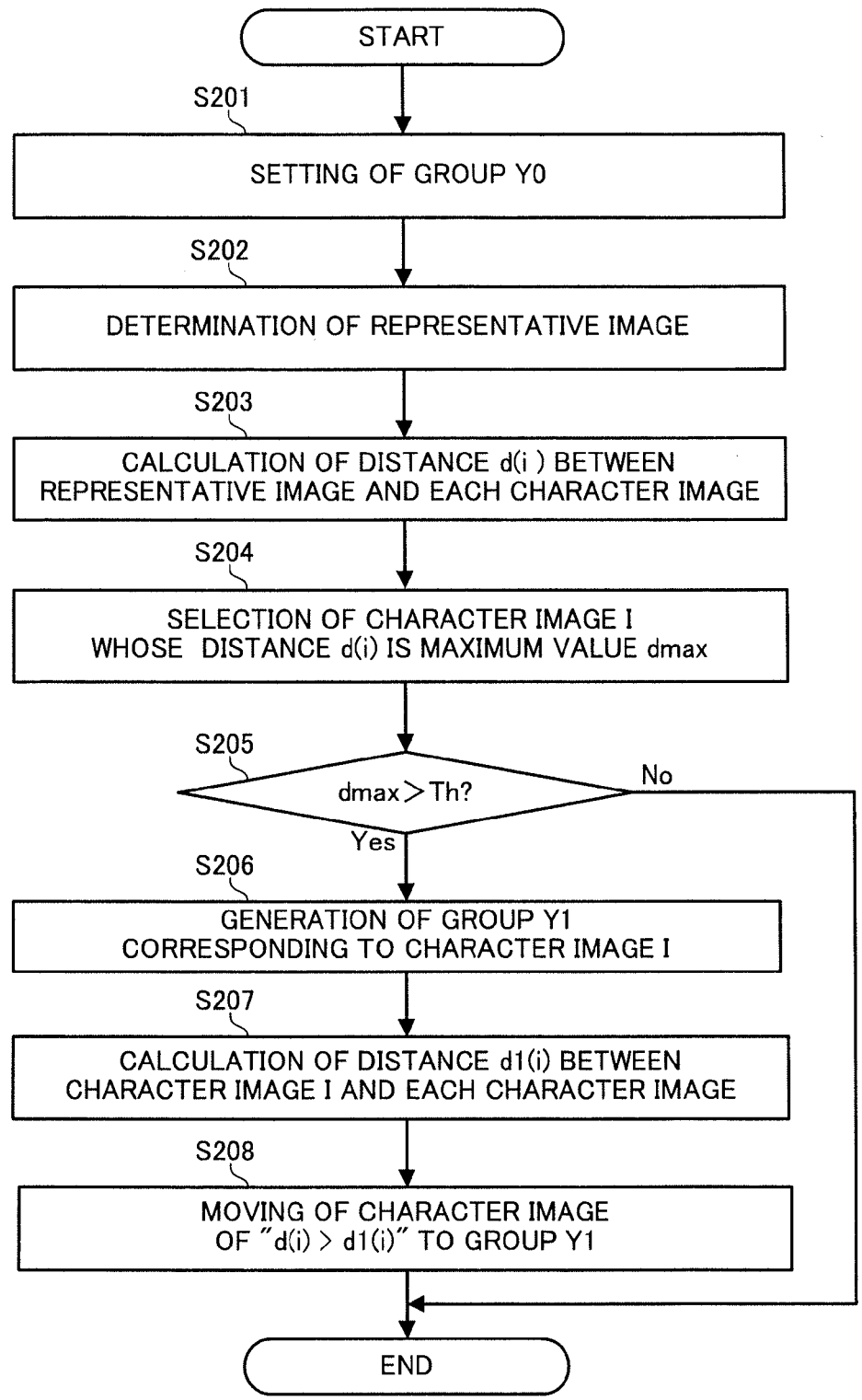
FIG. 9 is a flowchart showing an operation of classifying a character image by comparison with a representative image.

Hereinafter, a second embodiment will be described with reference to FIG. 8 to FIG. 10. FIG. 8 is a diagram showing a configuration of a character recognition system of the second embodiment. FIG. 9 is a flowchart showing an operation to classify character images by comparison with a representative image. It should be noted that in the second embodiment, a configuration similar to that of the first embodiment is given the same reference symbol and explanation thereof is omitted.

The character recognition system of the second embodiment is, as shown in FIG. 8, made by further adding an input section 26 and a judgment reception section 27 to the configuration of the first embodiment.

In the above-described first embodiment, the verification image is only displayed in the monitor 3 to be verified by a user. On the other hand, in the second embodiment, if there is a possibility that a character image classified into each character group is misclassified, the character image is reclassified into a new group or another group in response to a direction of an operator. In other words, in the second embodiment, a verification image generation section 23 performs clustering of the character images in a group. Then, the verification image generation section 23 classifies an image character exceeding a parameter (later-described threshold value Th) for grouping set in advance into a new group, segmenting the group before clustering.

The input section 26, a keyboard or the like for example, inputs a command corresponding to a key operated by the operator into a computer 2. The judgment reception section 27 receives the command (for example, of "Y" key or "N" key) corresponding to the key, the command inputted from the input section 26, and obtains a result of right/wrong judgment of the group given by operator to the presented verification image.

The operator verifies the verification image displayed in a monitor 3. The operator, if judges that the group of a recognition result is right, presses the "Y" key or the like for example of the keyboard as the input section 26. The operator, when judges that group contains misclassification (wrong), presses an "N" key or the like for example of the keyboard. Input of "N" to the verification image of each group means indirect input of "corresponding group includes at least one erroneously recognized character image(s)".

The judgment reception section 27 performs a different processing in correspondence with a pressed key. For example, when the "Y" key is pressed, the judgment reception section 27 notifies the verification image generation section 23 to proceed to a processing of a next character group. On the other hand, when the "N" key is pressed, there is a possibility that a misrecognized image character is mixed in that group. Thus, the judgment reception section 27 makes the verification image generation section 23 perform a processing to reclassify that group.

The verification image generation section 23 generates a verification image from character images. More specifically, all the obtained character images are classified per a character group by character recognition result, similarly to the first embodiment.

In a recognition result obtaining section 22 in the second embodiment, a representative image representing a group is generated by using a density image normalized in terms of a size, as a character image. More specifically, a size (a range of one character image) of the character image is presumed as constant. Then, the range of one character image is sectioned into meshes (mapping of the mesh). Next, an average value (an average pixel value, an average density) of pixel values (densities of pixels) is computed per a mesh of a plurality of image characters included in the group. The representative image can be defined as aggregate of the meshes (pixels) of the average pixel value.

Here, a plurality of pixels of the character image is included in one mesh. On the other hand, it is possible to make the pixel of the image and the mesh correspond one to one.

In this embodiment, a gray image is used as an image being a recognition object. The gray image is a gray image of 256 tones in total, with a pixel value of a black pixel being "0" and a pixel value of a white pixel being "255", and a character is written in black. Further, a density value of the image in the present example is defined by (255—pixel value in image being recognition object). In other words, a density value of the white pixel is "0" and a density value of the black pixel is "255".

However, the image which can be dealt with is not limited to the gray image. For example, a color image can be converted into a gray image by using a color conversion processing and can be similarly processed. Further, in a case that a binary image is an object, it is possible to create a representative image in each mesh based on the number of black pixels of a character image belonging to a group. Further, it is possible to create a plurality of gray images corresponding to each of a plurality of character images based on the number of black pixels of each character image in each mesh. A representative image is generated from those plural gray images.

Next, the verification image generation section 23 performs a clustering processing to each character group by using the representative image representing the character group, thereby to classify (section) each character group into further small ones. It should be noted that in classifying the character image into the character group, it is possible to classify without performing clustering at a first time similarly to the first embodiment and to classify after performing clustering at a second or more time.

Here, a method for reclassifying by clustering will be described with reference to a flowchart of FIG. 9, and FIG. 10 to FIG. 13.

The verification image generation section 23 sets an initial group Y0 (S201). In this example, explanation is done by an example of a character group Y0 of character images 90a to 90e whose character recognition results are "1" as shown in FIG. 10.

The verification image generation section 23 generates (determines) a representative image 91 of the group (step S202). With regard to each of meshes (pixels) sectioning the respective character images 90a to 90e crisscross, an average K of densities of all the character images included in the same group is obtained as in the following formula (2). Based on the average K, the representative image 91 is determined.

$$K = \Sigma C i / N \qquad \text{formula (2)}$$

Ci: density value of i-th character image in group
N: number of character images in group However, how to determine the representative image 91 is not limited to this example (a method in which an average of densities is obtained). The representative image 91 can be determined by using another calculation method. For example, a character image having a smallest total sum of distances to other character images in the group can be taken as a representative image 91. Further, it is possible to obtain an image (an average image) by using the method by which the representative image has been obtained and to take a character image closest to the average image as a representative image 91.

Next, the verification image generation section 23 calculates a distance (similarity) between pixels of the representative image 91 of each of the character images 90a to 90e (step S203). In other words, for each of the character images, a distance d(i) of a pixel block (a mesh) of the representative image 91 is obtained. Here, i indicates a serial number of a character image in the group, taking a value of 1 to N. It should be noted that N is the number of the character images in the group.

The distance d(i) between pixels can be defined as a square root of a square sum of a density difference in the respective meshes as in the following formula (3) for example.

$$d(i) = (\Sigma (C(i) - C0)^2)^{1/2} \qquad \text{formula (3)}$$

d(i): distance between pixels
C(i): density value of i-th character image
C0: density value of representative image However, the distance d(i) can be defined by using another definition, such as by using Maharanobis' generalized distance for example.

Next, the verification image generation section 23 determines a character image X which is the furthest from the representative image in terms of a distance d(i) (which has low similarity) (step S204). In this example, the character image 90d is equivalent to the character image X. Hereinafter, a serial number i of the character image giving the character image X is referred to as imax.

Subsequently, if a distance d (imax) between the character image X and the representative image exceeds a threshold value Th, the verification image generation section 23 classifies that character image I into another group (a new group) Y1 which is newly generated (steps S205, S206).

Here, the threshold value Th may be determined in advance, or may be determined dynamically by using an average or a median value of the distance d(i) for example.

Lastly, the verification image generation section 23 classifies the character images in an original group into either one of two groups Y0, Y1 (steps S207, S208).

Figure 13:
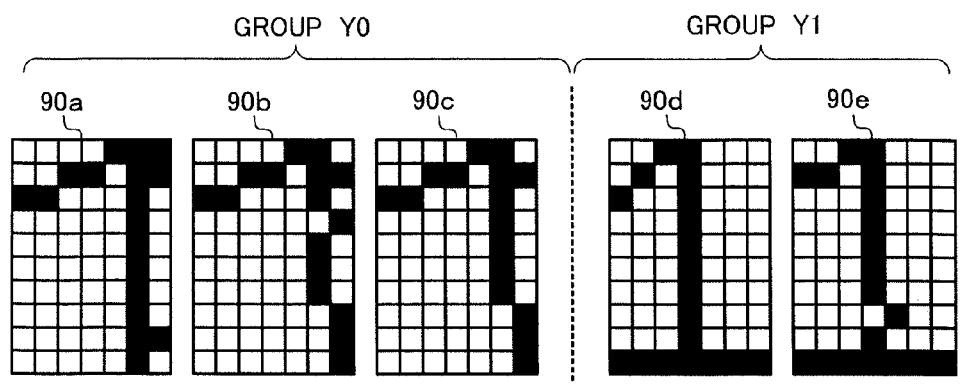
FIG. 13 is a diagram showing an example in which character images are classified into either one of two groups Y0, Y1.

In other words, it is examined which of the classified character image and the representative image each character image remaining in the classified group is closer to (similar to), and the character image is classified into the closer group, as shown in FIG. 13.

Here, the representative image can be recalculated from only the images remaining in the group. In an example of FIG. 13, the character images 90a to 90c are classified into the original group Y0, while the character image 90d and the character image 90e are classified into a new group Y1. It is understood that there is an aggregate of images in which the character images of the original group Y0 are close to "1" in Gothic font and that the character images of the new group Y1 are close to "1" in Mincho font.

In other words, as a result of the above-described processings, if an image distant from the average by the threshold Th or more, that is, an image not similar (in which a distant d is large) to the representative image, is included in one group, that image and an image close (a distant d is small, similar) to that image are classified into another group.

Figure 10:
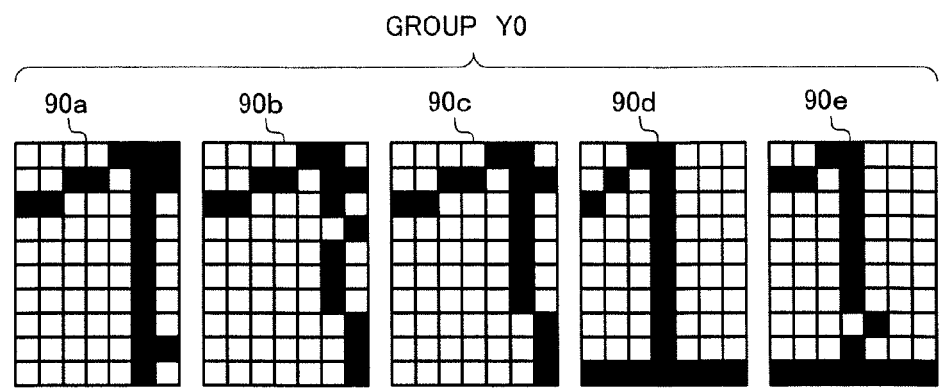
FIG. 10 is a diagram showing an example of a character group of character images whose character recognition results are "1".
Figure 11:
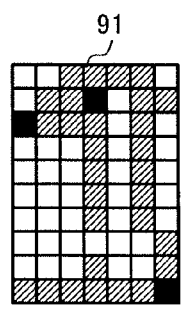
FIG. 11 is a diagram showing a representative image generated from the character images of FIG. 10.
Figure 12:
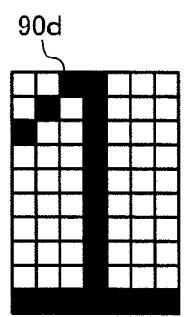
FIG. 12 is a diagram showing a character image selected as a character image in which a distance between pixels is farthest.

Usage of this method enables reclassification of character images and generation of a proper verification image in a case that a character image in a different font of the same character is included in the same group as in an example of FIG. 10. In other words, in such a case, since the character image in the different font is included, it is difficult to generate a proper verification image from a plurality of character images in a group (superimposing cannot be done well) since the character image in the different font is included. In contrast, character images of the same numeral are reclassified into groups by fonts, thereby those character groups are capable of generating a proper verification image.

After reclassifying the character image which could have been misclassified into another group, the verification image generation section 23 generates a verification image per a reclassified group. Here, the verification image can be constituted by combining two images (for example, a minimum value image and a maximum value image). The minimum value image is an image in which a minimum pixel value in the group is taken as a pixel value per a mesh (which corresponds to a pixel of the minimum value image). On the other hand, the maximum value image is an image in which a maximum pixel value in the group is taken as a pixel value per a mesh (which corresponds to a pixel of the maximum value image).

Here, the minimum value image is considered to be equivalent to a character image in a case of the thinnest density and is equivalent to the AND image of the first embodiment. On the other hand, the maximum value image is considered to be equivalent to a character image in a case of the thickest density as well and is equivalent to the OR image of the first embodiment. Usage of this method enables an operator verify a recognition result at a high speed similarly to the first embodiment.

Next, the judgment reception section 27 obtains a judgment result of the operator by a key inputted from the input section 26. If the judgment result is "Yes", the processings are terminated.

On the other hand, if the judgment result is "No", the judgment reception section 27 notifies the verification image generation section 23 to reclassify the character group, thereby to make the character group reclassified. It is because a character image of a different character is included (that is, misrecognition is included) in the group.

More specifically, the judgment reception section 27 makes the verification image generation section 23 perform reclassification with a threshold value Th of grouping made smaller than in a previous processing. Here, if a result of the grouping is unchanged, the processing can be repeated with the threshold value Th made further smaller, until the group is further sectioned.

If the above is repeated until a group including only misrecognized character images is generated, only the misrecognized character images can be extracted. It should be noted that repetition can be terminated at a certain stage such as a point when the number of the character images in the group falls sufficiently for example.

As described above, according to the character recognition system of the second embodiment, an operator can verify a recognition result of many characters collectively by verifying a recognition image. Repetition of these processes for a group including some errors enables high-speed specification of misrecognized character.

(Third Embodiment)

Figure 14:
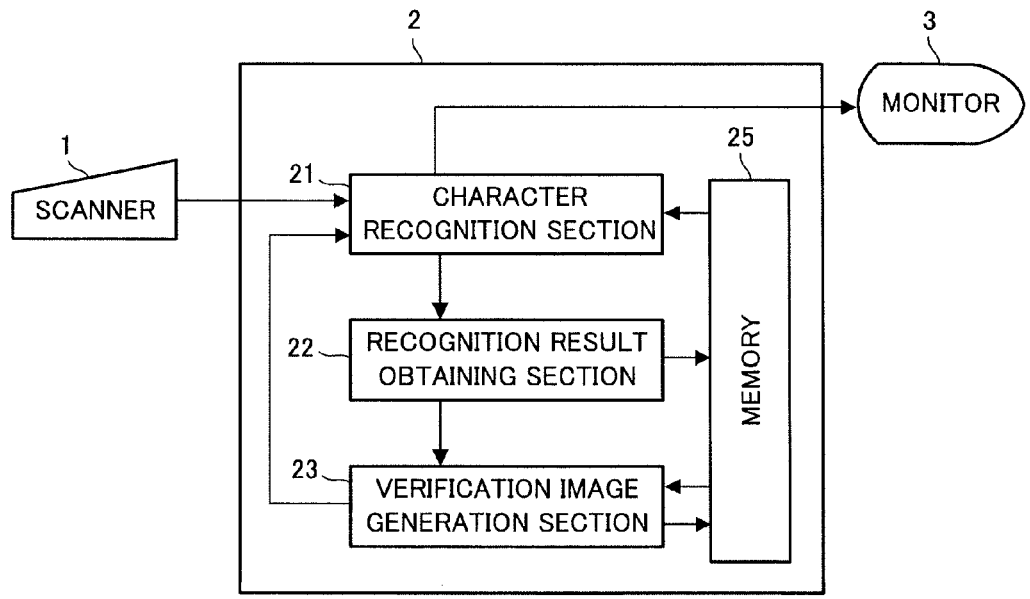
FIG. 14 is a diagram showing a configuration of a character recognition result verification apparatus of a third embodiment.

Hereinafter, a third embodiment will be described with reference to FIG. 14. FIG. 14 is a diagram showing a configuration of a character recognition system of the third embodiment. It should be noted that in the third embodiment a similar configuration to that of the first embodiment is given the same reference symbol and explanation thereof is omitted.

The character recognition system of the third embodiment, made by eliminating a verification image output section 24 from the configuration of the first embodiment, is configured to input a verification image generated by a verification image generation section 23 into a character recognition section 21 as shown in FIG. 14.

The character recognition section 21 performs character recognition to the inputted verification image. If the recognition image cannot be normally recognized as a character, a character image which could have been misrecognized is included. Thus, the character recognition section 21 makes a character group name, a message indicating "character image(s) with a possibility of misrecognition is included in that character group" or the like displayed in a monitor 3. In other words, the character recognition section 21 recognizes the recognition image generated by the verification image generation section 23. When a character recognized from the verification image is different from a character recognized from a character image of an original group, the character recognition section 21 judges that a character image having been misrecognized is included in the same group and outputs to that effect.

In the above-described second embodiment, the verification image is outputted from the verification image output section 24 to the monitor 3 thereby to display (present) in the screen. The operator is made to verify the verification image and the operator is made to judge that there is a possibility that the character image is misrecognized and to input by key a result of right/wrong judgment. On the other hand, in the third embodiment, the verification image generated by the verification image generation section 23 is inputted to the character recognition section 21, the character recognition section 21 is made to recognize the verification image, thereby a possibility of misrecognition is automatically judged. There is displayed in the monitor 3, as the judgment result, the character group name or the like which has a possibility of including the character image having been misrecognized.

According to the character recognition system of the third embodiment, a possibility of misrecognition is automatically judged per a group, and a name of a character group including a misrecognized character image is displayed in a monitor 3 or the like and is presented to an operator. As a result, contribution to improvement of accuracy in classifying character groups is possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In other words, by combining a plurality of components disclosed in the above-described embodiments accordingly, various inventions can be formed. Meanwhile, some components can be removed from the whole components described in the embodiment. Further, components according to different embodiments can be combined accordingly.

Further, each component described in the above-described embodiments can be realized by a program installed in a storage such as a hard disk device of a computer and so on. The program can be stored in a computer-readable electronic medium. By making the program read by the computer from the electronic medium, the computer can realize the function of the embodiment. As the electronic medium, there are included a storage medium such as a CD-ROM, a flash memory, a removable medium and the like for example. Further, the function of the embodiment can be realized by storing the components in different computers connected via a network in a distributing manner and performing communication among the computers in which respective components are made to function.

What is claimed is:

1. A character recognition result verification apparatus, comprising:
    a group generation section generating a group including a plurality of character images recognized as the same character from a document image including a plurality of character images; and
    a verification image generation section generating a verification image including a first region and a second region by superimposing the plurality of character images included in the generated group,
    wherein the first region corresponds to a pixel having the same pixel value in all of the plurality of character images and the second region corresponds to a pixel having the same pixel value in a part of the plurality of character images.

2. The character recognition result verification apparatus as set forth in claim 1,
    wherein the first region is sectioned into a first portion and a second portion, the first portion constituting a part of the character in all of the plurality of character images included in the generated group and the second portion not constituting a part of the character in any of the plural character images included in the generated group;
    wherein the second region is a third portion constituting a part of the character in a part of the plurality of character images included in the generated group; and
    wherein display statuses in the respective first to third portions are different.

3. The character recognition result verification apparatus as set forth in claim 2,
    wherein the verification image generation section generates a verification image in which the third portion is sectioned, depending on a frequency of appearances of the pixel value in the plurality of character images.

4. The character recognition result verification apparatus as set forth in claim 1,
    wherein the verification image is constituted by a combination of a first image and a second image;
    wherein the first image has a first portion constituting a part of the character in all of the plurality of character images included in the generated group; and
    wherein the second image has a third portion constituting a part of the character in a part of the plurality of character images included in the generated group.

5. The character recognition result verification apparatus as set forth in claim 1,
    wherein the verification image generation section determines a representative image representing the generated group;
    wherein the verification image generation section computes a similarity degree between the determined representative image and each of the plurality of character images;
    wherein the verification image generation section segments the group based on the computed similarity degree; and
    wherein the verification image generation section superimposes the plurality of character images included in the segmented group thereby to generate a plurality of verification images corresponding to each of the segmented groups.

6. The character recognition result verification apparatus as set forth in claim 5,
    wherein the verification image generation section segments the group and generates the plurality of verification images corresponding to each of the segmented groups, when the computed similarity degree exceeds a predetermined threshold value.

7. The character recognition result verification apparatus as set forth in claim 6, comprising:
    a reception section receiving recognition information to recognize a segmented group in which an erroneously character-recognized character image is included, as a verification result of the verification image,
    wherein the verification image generation section alters the predetermined threshold value for the segmented group corresponding to the recognition information thereby to further segment the segmented group, and generates a plurality of verification images corresponding to each of the groups having been further segmented.

8. The character recognition result verification apparatus as set forth in claim 1, further comprising:
    a character recognition section recognizing the generated verification image and judging whether or not the recognized character is different from the same character.

9. A character recognition result verification method, comprising:
    generating a group including a plurality of character images recognized as the same character from a document image including a plurality of character images; and
    generating a verification image including a first region and a second region by superimposing the plurality of character images included in the generated group,
    wherein the first region corresponds to a pixel having the same pixel value in all of the plurality of character images and the second region corresponds to a pixel having the same pixel value in a part of the plurality of character images.

10. The character recognition result verification method as set forth in claim 9,
    wherein the first region is sectioned into a first portion and a second portion, the first portion constituting a part of the character in all of the plural character images included in the generated group and the second portion not constituting a part of the character in any of the plurality of character images included in the generated group,
    wherein the second region is a third portion constituting a part of the character in a part of the plurality of character images included in the generated group, and
    wherein display statuses in the respective first to third portions are different.

11. The character recognition result verification method as set forth in claim 10,
    wherein the generating the verification image comprises generating a verification image in which the third portion is sectioned, depending on a frequency of appearances of the pixel value in the plurality of character images.

12. The character recognition result verification method as set forth in claim 9,
    wherein the verification image is constituted by a combination of a first image and a second image,
    wherein the first image has a first portion constituting a part of the character in all of the plurality of character images included in the generated group, and wherein the second image has a third portion constituting a part of the character in a part of the plurality of character images included in the generated group.

13. The character recognition result verification method as set forth in claim 9,
wherein the generating the verification image comprises:
determining a representative image representing the generated group;
computing a similarity degree between the determined representative image and each of the plurality of character images,
segmenting the group based on the computed similarity degree, and
superimposing the plurality of character images included in the segmented group thereby to generate a plurality of verification images corresponding to each of the segmented groups.

14. The character recognition result verification method as set forth in claim 13,
wherein, in the generating the verification image, the group is segmented and the plurality of verification images corresponding to each of the segmented groups is generated, when the computed similarity degree exceeds a predetermined threshold value.

15. The character recognition result verification method as set forth in claim 14, comprising:
receiving recognition information to recognize a segmented group in which an erroneously recognized character image is included, as a verification result of the verification image,
wherein, in the generating the verification image, the predetermined threshold value is altered for the segmented group corresponding to the recognition information thereby to further segment the segmented group, and a plurality of verification images corresponding to each of the groups having been further segmented is generated.

16. The character recognition result verification method as set forth in claim 9, further comprising:
recognizing the generated verification image and judging whether or not a recognition result thereof is different from the same character.

* * * * *